US009587967B1

(12) United States Patent
Salter et al.

(10) Patent No.: US 9,587,967 B1
(45) Date of Patent: Mar. 7, 2017

(54) VEHICLE CONTAINER ILLUMINATION

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/228,212

(22) Filed: Aug. 4, 2016

(51) Int. Cl.
*B60Q 1/00* (2006.01)
*B60Q 1/26* (2006.01)
*G01D 11/28* (2006.01)

(52) U.S. Cl.
CPC .................... *G01D 11/28* (2013.01)

(58) Field of Classification Search
CPC ...... B60Q 1/0011; B60Q 3/002; B60Q 3/004; B60Q 3/008; B60Q 3/022; B60Q 3/06; G01D 11/28
USPC ........ 362/487–488, 496, 502, 509–511, 540, 362/543–549
See application file for complete search history.

(56) References Cited

U.S. PATENT DOCUMENTS

| 5,709,453 A | 1/1998 | Krent et al. |
| 5,842,763 A | 12/1998 | Lakosky |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

An engine compartment illumination system is provided that includes a first container including a first cap including a light source operable to emit an excitation emission, a window, and an optics system configured to direct a portion of the excitation emission through the window. A second container is positioned proximate the first container and includes a second cap and an indicia positioned proximate the second cap. The excitation emission is configured to excite the indicia.

18 Claims, 8 Drawing Sheets

(56) References Cited

U.S. PATENT DOCUMENTS

| | | |
|---|---|---|
| 7,901,111 B2 | 3/2011 | Negley et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2011/0226359 A1 | 9/2011 | Taylor |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0039329 A1 | 2/2016 | Sorensen |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102011114075 A1 | 6/2012 |
| DE | 202015102169 U1 | 11/2015 |
| EP | 1793261 A1 | 6/2007 |
| EP | 2778209 A1 | 9/2014 |
| FR | 2653555 A1 | 4/1991 |
| JP | 2000159011 A | 6/2000 |
| JP | 2007238063 A | 9/2007 |
| JP | 2009250109 A | 10/2009 |
| WO | 2006047306 A1 | 5/2005 |
| WO | 2006047306 A1 | 5/2006 |
| WO | 2014068440 A1 | 5/2014 |

VEHICLE CONTAINER ILLUMINATION

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from photoluminescent materials offers a unique and attractive viewing experience. It is therefore desired to incorporate such photoluminescent materials in portions of vehicles for various lighting applications.

SUMMARY OF THE INVENTION

According to one aspect of the present invention, an engine compartment illumination system is provided that includes a first container including a first cap including a light source operable to emit an excitation emission, a window, and an optics system configured to direct a portion of the excitation emission through the window. A second container is positioned proximate the first container and includes a second cap and an indicia positioned proximate the second cap. The excitation emission is configured to excite the indicia.

According to another aspect of the present disclosure, an illumination system for a vehicle container configured to contain a fluid is provided and includes a cap positioned on the container including a light source operable to emit an excitation emission, a window, and an optics system configured to direct a portion of the excitation emission through the window; and an indicator positioned on the container. The excitation emission is configured to excite the fluid and the indicator.

According to yet another aspect of the present disclosure an illumination system for a vehicle container is provided that includes a fluid disposed in the container and a light source positioned on the container and operable to emit an excitation emission. The excitation emission is configured to excite the fluid such that a fluid level is determined based on a degree of illumination of the container.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein.

However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1A:
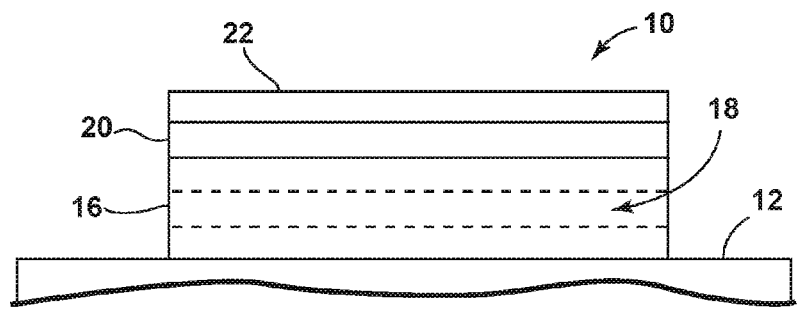
FIG. 1A is a side view of a photoluminescent structure rendered as a coating for use in a vehicle light strip according to one embodiment.
Figure 1B:
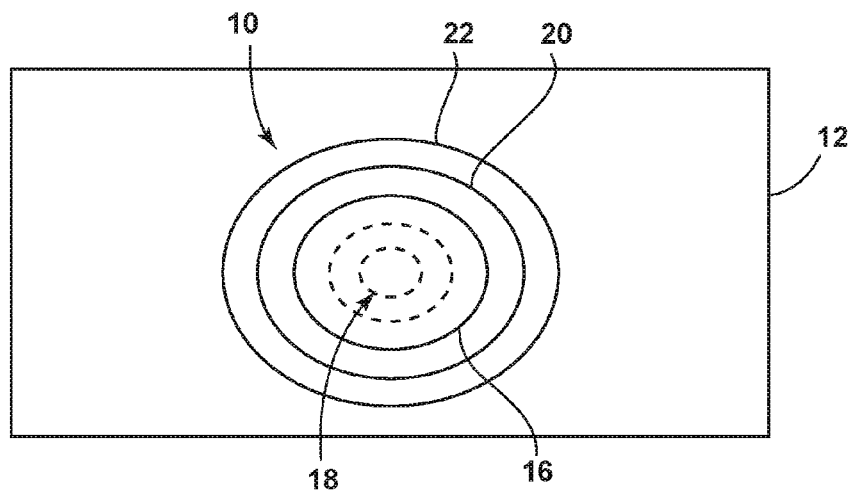
FIG. 1B is a top view of a photoluminescent structure rendered as a discrete particle according to one embodiment.
Figure 1C:
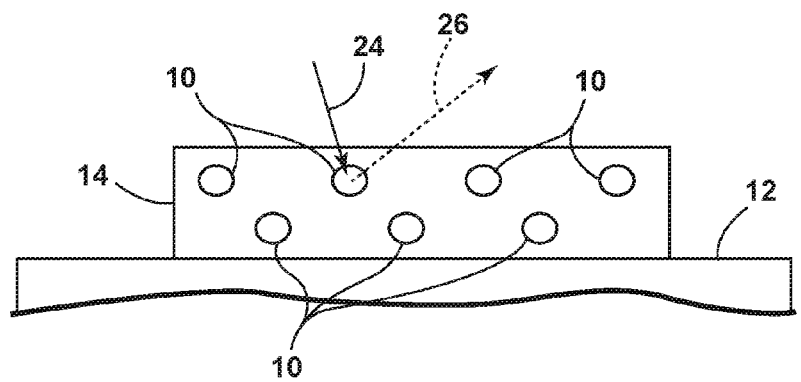
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation emission 24 of a specific wavelength, thereby causing the light to undergo a conversion process. Under the principle of down conversion, the excitation emission 24 is converted into a longer wavelength, converted light 26, that is outputted from the photoluminescent structure 10. Conversely, under the principle of up conversion, the excitation emission 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 44 (FIG. 4B) is referred to herein as the excitation emission 24 or excitation light and is illustrated herein as solid arrows. In contrast, light emitted from the photoluminescent structure 10 is referred to herein as converted light 26 and is illustrated herein as broken arrows. The mixture of excitation emission 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation emission 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation emission 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation emission 24 emitted from the light source 44. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation emission 24. The excitation emission 24 may be emitted from any excitation source (e.g., any natural light source, such as the sun, and/or any artificial light source 44). The long persistence photoluminescent material 18 may be defined as having a long decay time due to its ability to store the excitation emission 24 and release the converted light 26 gradually, for a period of several minutes or hours, once the excitation emission 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 44 that emits the excitation emission 24, including, but not limited to, natural light sources (e.g., the sun) and/or any artificial light source 44. The periodic absorption of the excitation emission 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation emission 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation emission 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation emission 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
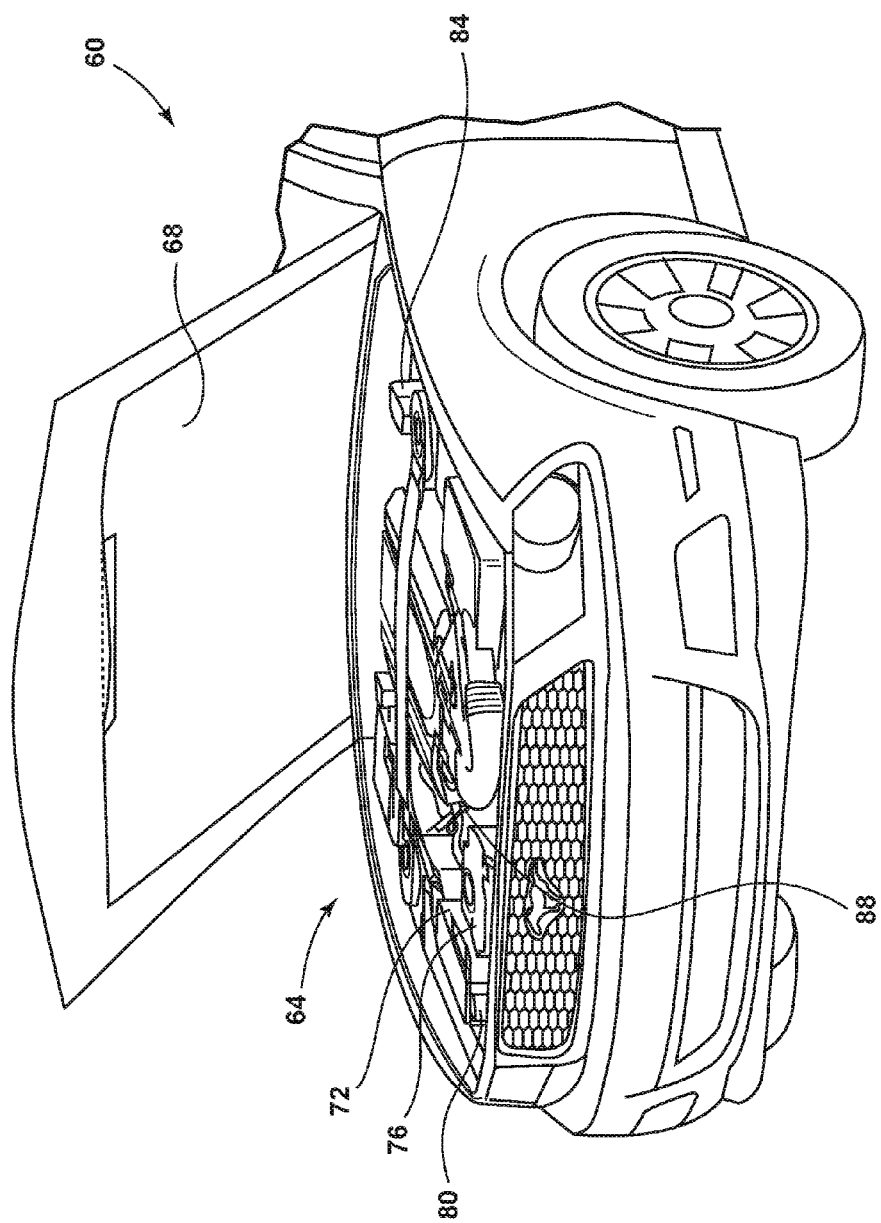
FIG. 2 is a front perspective view of a vehicle, according to one embodiment.

Referring now to FIG. 2, depicted is a wheeled motor vehicle 60 having an engine compartment 64 accessible by moving a hood 68. It will be understood that although the vehicle 60, in the depicted embodiment, is a car, the vehicle 60 may equally be a truck, sports utility vehicle, boat, farm equipment or other vehicle having an engine compartment 64 without departing from the teachings provided herein. The hood 68 may be a panel that pivots between a downward closed position that conceals the engine compartment 64 and an upward open position that exposes the engine compartment 64. According to various embodiments, the engine compartment 64 may include an illumination system 72 configured to increase the visibility and/or aesthetic appeal of at least one fixture located within the engine compartment 64 of the vehicle 60. According to various embodiments, the fixtures may include one or more fluid (e.g., liquid) bottles, or containers, within the engine compartment 64. Exemplary fixtures within the engine compartment 64 which may be illuminated by the illumination system 72 may include an engine coolant bottle 76, a washer fluid bottle 80 and/or a power steering bottle 84. Further, other fixtures such as an engine oil dipstick 88, or an engine oil cap may be used in conjunction with the illumination system 72. Maintaining proper fluid levels in each of the bottles 76, 80, 84 is important to ensure that the vehicle 60 continues to function correctly and to prevent damage from occurring to the vehicle 60. According to various embodiments, the illumination system 72 may be utilized to maintain proper fluid levels within the bottles 76, 80, 84.

Figure 3A:
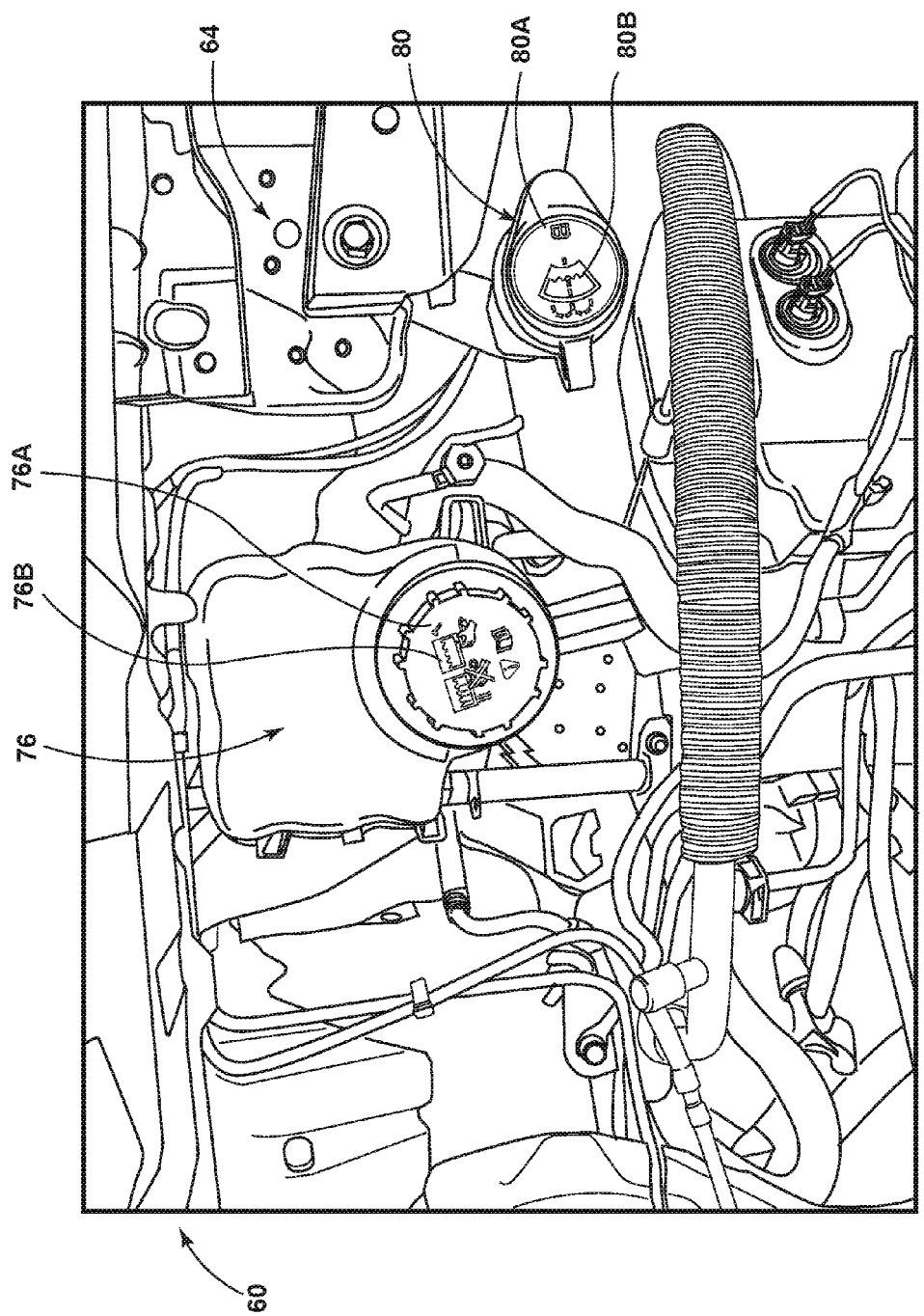
FIG. 3A is a top plan view of an engine compartment of the vehicle of FIG. 2, according to one embodiment.

Referring now to FIG. 3A, the engine coolant bottle 76 is positioned proximate the washer fluid bottle 80. The engine coolant bottle 76 includes a coolant cap 76A having a first indicium 76B positioned thereon. The first indicium 76B may be lettering, numbering or other text or symbols configured to display information regarding the type of coolant fluid designed to be used by the vehicle 60. Similarly to the engine coolant bottle 76, the washer fluid bottle 80 may include a washer cap 80A having a second indicium 80B. The second indicium 80B may be configured to indicate the location of the washer fluid bottle 80, what type of washer fluid to use, and other information. The coolant cap 76A and the washer cap 80A may both be positioned on, screwed to, or otherwise coupled with the respective engine coolant and washer fluid bottles 76, 80 to retain fluids and prevent contaminants from entering the bottles 76, 80. The first and second indicia 76B, 80B may be composed of the photoluminescent structure 10 as described above and below. According to a specific embodiment, the photoluminescent structure 10 of the first and second indicia 76B, 80B may be a long-persistent phosphor embodiment of the photoluminescent structure 10.

Figure 3B:
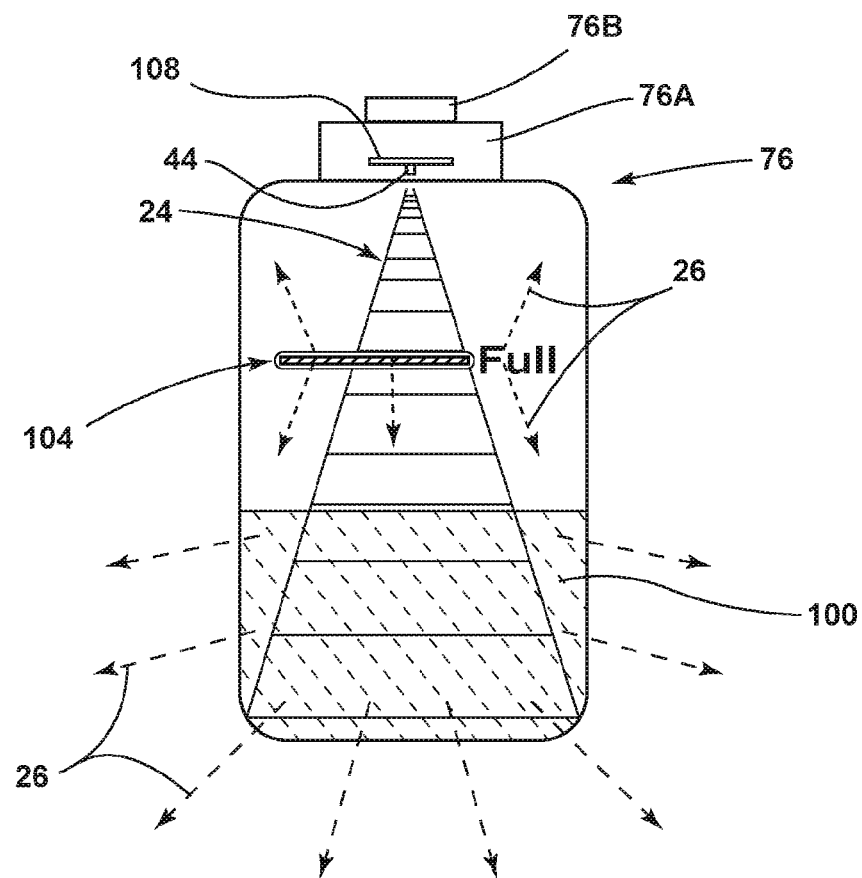
FIG. 3B is a side view of an engine coolant bottle and illumination system, according to one embodiment.

Referring now to FIG. 3B, according to one embodiment, the illumination system 72 may be contained in a single fixture, container or fluid bottle (e.g., one or more of the engine coolant bottle 76, washer fluid bottle 80 and/or the power steering bottle 84). In the depicted embodiment, a coolant fluid 100 is positioned, and held by, the engine coolant bottle 76. When in use, the engine coolant bottle 76 functions as a reservoir for the coolant fluid 100. The engine coolant bottle 76 may be composed of a durable polymer (e.g., plastic) capable of resisting the heat and chemical composition of a coolant fluid 100. Preferably the engine coolant bottle 76 is translucent or substantially transparent such that a fluid level within the bottle 76 can be viewed by a person. The coolant fluid 100 may have a high heat capacity and serve as a heat-transfer medium for the engine of the vehicle 60. In a specific embodiment, the coolant fluid 100 may be antifreeze. Antifreeze, may be a solution of a suitable organic chemical (e.g., ethylene glycol, diethylene glycol, or propylene glycol) in water. The coolant fluid 100 may include additives such as fluorescein, corrosion inhibitors and/or alcohols. In order to ensure a proper amount of coolant fluid 100 is maintained in the engine coolant bottle 76, one or more indicators 104 may be positioned on the engine coolant bottle 76. The indicator 104 may be molded into the side of the engine coolant bottle 76, adhered to, or combinations thereof. According to various embodiments, the indicators 104 may correspond to a maximum fill level, a minimum fill level, or an indicium conveying other information. According to various embodiments, the indicator 104 may include the photoluminescent structure 10. In such an embodiment, the indicator 104 may be applied to an external surface of the engine coolant bottle 76 by any of the aforementioned application methods described in connection with the photoluminescent structure 10, including painting, screen printing, and pad printing.

In the depicted embodiment, positioned within the coolant cap 76A is the light source 44. It will be understood that the light source 44 may additionally or alternatively be positioned outside of the coolant cap 76A (e.g., on a top or on a side of the engine coolant bottle 76) without departing from the teachings provided herein. The light source 44 may be a light emitting diode (LED), incandescent bulb, or other suitable light source 44. It will be understood that the light source 44 may include a plurality of individual light emitting diodes and/or incandescent bulbs without departing from the teachings provided herein. The light source 44 may be positioned on a printed circuit board 108 configured to provide support and electrical power to the light source 44. In an exemplary implementation, the light source 44 is configured to emit the excitation emission 24 into the engine coolant bottle 76 and the engine coolant 100. The excitation emission 24 may have a blue spectral color range or may be in the ultraviolet wavelength band. The blue spectral color range includes a range of wavelengths generally expressed as blue light (~440-500 nm). In ultraviolet implementations, the light source 44 may emit the excitation emission in wavelengths in a near ultraviolet color range (~390-450 nm). In some implementations, the excitation emission 24 may be approximately less than 500 nm such that the excitation emission 24 from the light source 44 is not significantly visible. The blue spectral color range and shorter wavelengths may be utilized as the excitation emission 24 for the illumination system 72 due to these wavelengths having limited perceptual acuity in the visible spectrum of the human eye. Due to the limited sensitivity of the human eye to light at such short wavelengths (e.g., blue colored light), the excitation emission 24 may go unnoticed to an onlooker of the illumination system 72.

The light source 44 is configured to emit the excitation emission 24 onto the coolant fluid 100 and/or the indicator 104. The excitation emission 24 is configured to cause the coolant fluid 100 to fluoresce (e.g., due to one or more additives such as fluorescein) and emit the converted light 26 and cause the indicator 104 to emit converted light 26 as explained above. By utilizing shorter wavelengths for the excitation emission 24, and converting the excitation emission to at least one longer wavelength, the illumination system 72 creates a visual effect of light originating from the coolant fluid 100 and the indicator 104. It will be understood that the converted light 26 emitted from the coolant fluid 100 may also be used to charge and/or excite the indicator 104 and vice versa. By causing the coolant fluid 100 and the indicator 104 to emit the converted light 26, a fluid level of the coolant fluid 100 may be determined based on a degree of illumination of the engine coolant bottle 76 (e.g., how high the illumination from the converted light 26 goes up the side of the bottle 76) when the fluid 100 is exposed to the excitation emission 24 compared to the indicator 104. As the fluid level rises within the engine coolant bottle 76, the unilluminated portion of the engine coolant bottle 76 (e.g., headspace above the coolant fluid 100) will decrease and as the fluid level falls, the illuminated portion of the engine coolant bottle 76 that is viewable by a person on the outside will decrease. As such, the fluid level of the coolant fluid 100 may be measured in low lighting conditions as both the fluid level and the indicator 104 may emit light. To aid in the determination of whether the fluid level is within the proper fill range, the indicator 104 may be configured to emit a different color converted light 26 than that emitted by the coolant fluid 100. Further, ion embodiments may utilize multiple indicators 104, and each indicator 104 may emit a different color converted light 26 (e.g., red for a minimum fluid level and green for a maximum fluid level).

Further, the coolant cap 76A may be formed via a dual-shot injection molding technique such that one or more portions of the cap 76A are translucent or transparent. For example, the first indicium 76B may be positioned over the translucent and/or transparent portion of the coolant cap 76A such that the first indicium 76B may be charged or otherwise excited by the excitation emission 24 (e.g., by reflection or directed upwards by the light source 44 through the translucent portion) and emit converted light 26. It will be understood that the foregoing description of the engine coolant bottle 76 and coolant cap 76A may be equally applied to the washer fluid bottle 80, washer cap 80A, power steering bottle 84 (FIG. 2), or other fluid bottles in the engine compartment 64 without departing from the teachings provided herein.

Figure 4A:
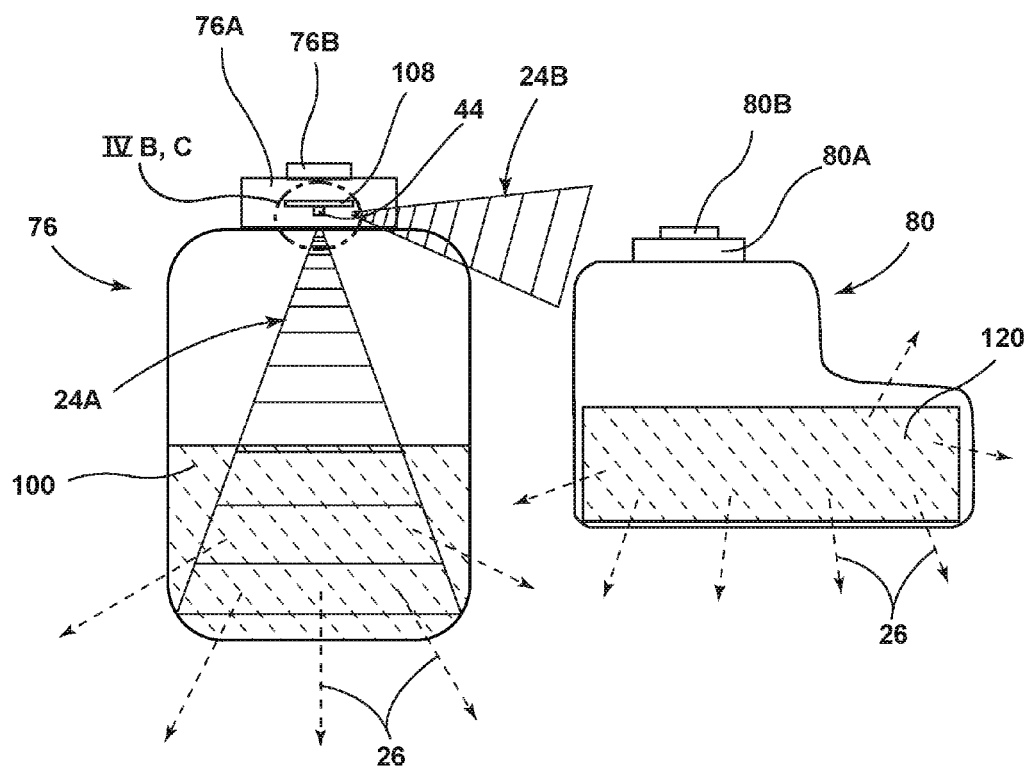
FIG. 4A is a side view of the engine coolant bottle and a washer fluid bottle and illumination system, according to one embodiment.

Referring now to the depicted embodiment of FIG. 4A, the light source 44 within the coolant cap 76A of the engine coolant bottle 76 may be configured to shine the excitation emission 24 onto the washer fluid bottle 80. In such an embodiment, the coolant cap 76A may include an optics system 116 configured to split the excitation emission 24 into a first portion 24A and a second portion 24B. The optics system 116 may direct the first portion 24A of the excitation emission 24 into the engine coolant bottle 76 and the second portion 24B onto the washer fluid bottle 80, the washer cap 80 and/or the second indicia 80B. The second portion 24B of the excitation emission 24 is configured to cause a washer fluid 120 positioned within the washer fluid bottle 76 to fluoresce similarly to the coolant fluid 100 of the engine coolant bottle 76. The second portion 24B may be transmitted though the washer fluid bottle 80 to cause the washer fluid 120 to fluoresce and emit converted light 26 similar to that of the coolant fluid 100. It will be understood that the second portion 24B of the excitation emission 24B may also be shown on the power steering bottle 84 and/or the engine oil dipstick 88 without departing from the teachings provided herein.

Figure 4B:
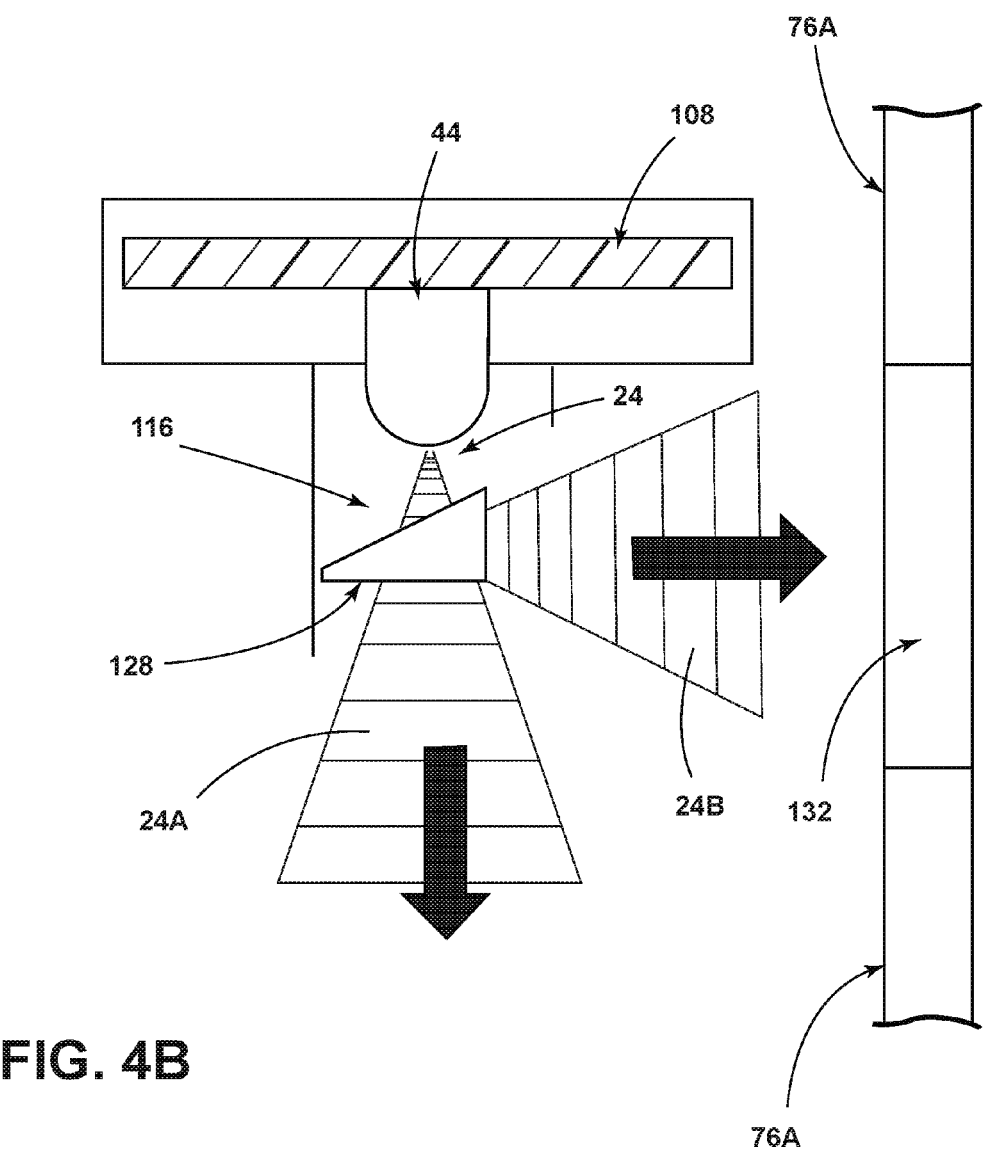
FIG. 4B is an enhanced view of the illumination system taken at section IVB of FIG. 4A.

Referring now to FIG. 4B, in the depicted embodiment, the optic system 116 includes an optical element 128 configured to split the excitation emission 24 into the first and second portions 24A, 24B. The optical element 128 may be a prism, as depicted, or a rectangular shaped lens. The optical element 128 may be oriented such that the excitation emission 24 strikes the optical element 128 at an angle less than or equal to a critical angle such that the first portion 24A passes though the optical element 128 into the engine coolant bottle 76 and the second portion 24 is directed through a window 132 defined by the coolant cap 76A. The window 132 may be a clear or transparent polymer (e.g., formed in the two-shot method disclosed above) or may be a hole in the coolant cap 76A. The window 132 is positioned on the coolant cap 76A such that the second portion 24B of the excitation emission 24 is directed onto one of the fixtures within the engine compartment 64.

Figure 4C:
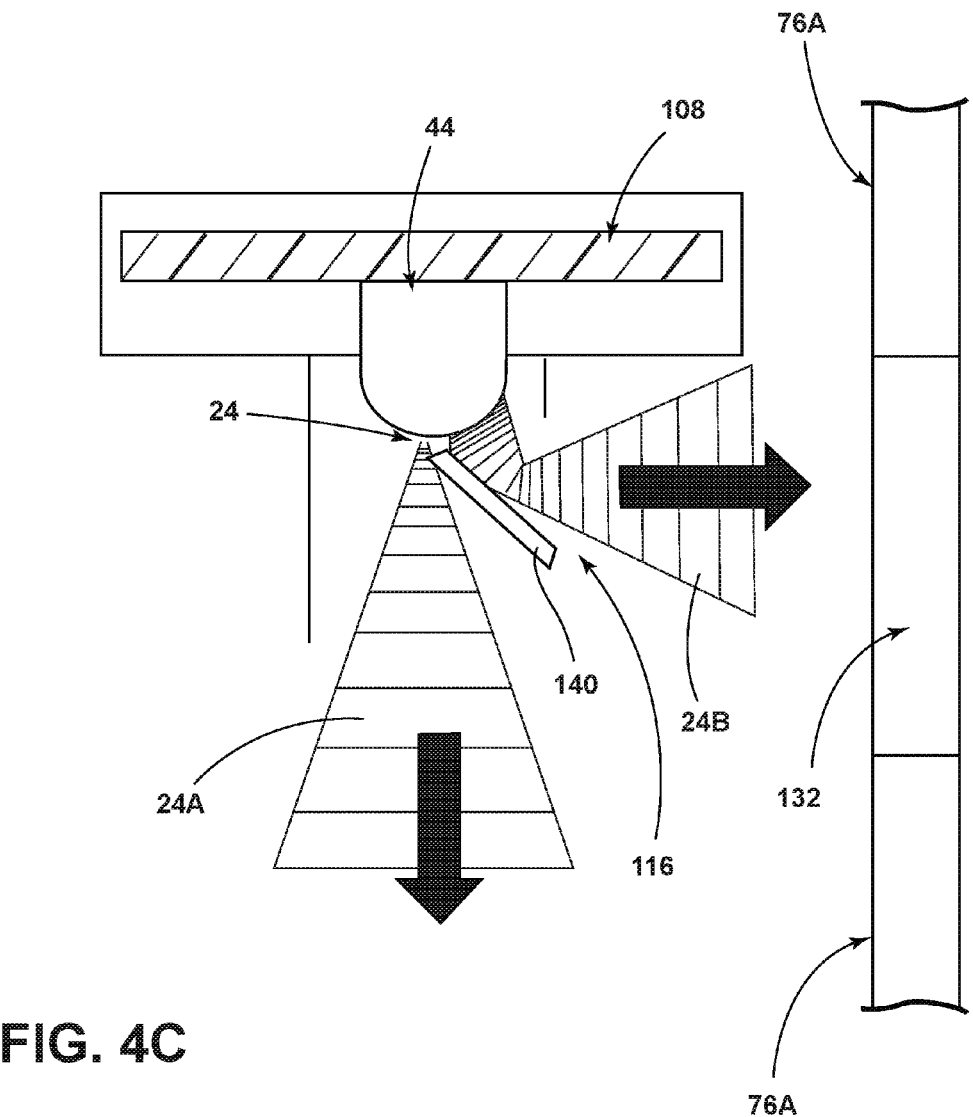
FIG. 4C is an enhanced view of the illumination system taken at section IVC of FIG. 4A.

Referring now to FIG. 4C, in the depicted alternate embodiment, the optics system 116 may include a mirror 140. The mirror 140 is positioned within the beam of the excitation emission 24 to separate and direct the second portion 24B through the window 132 of the coolant cap 76A while the first portion 24A continues into the engine coolant bottle 76.

Figure 5:
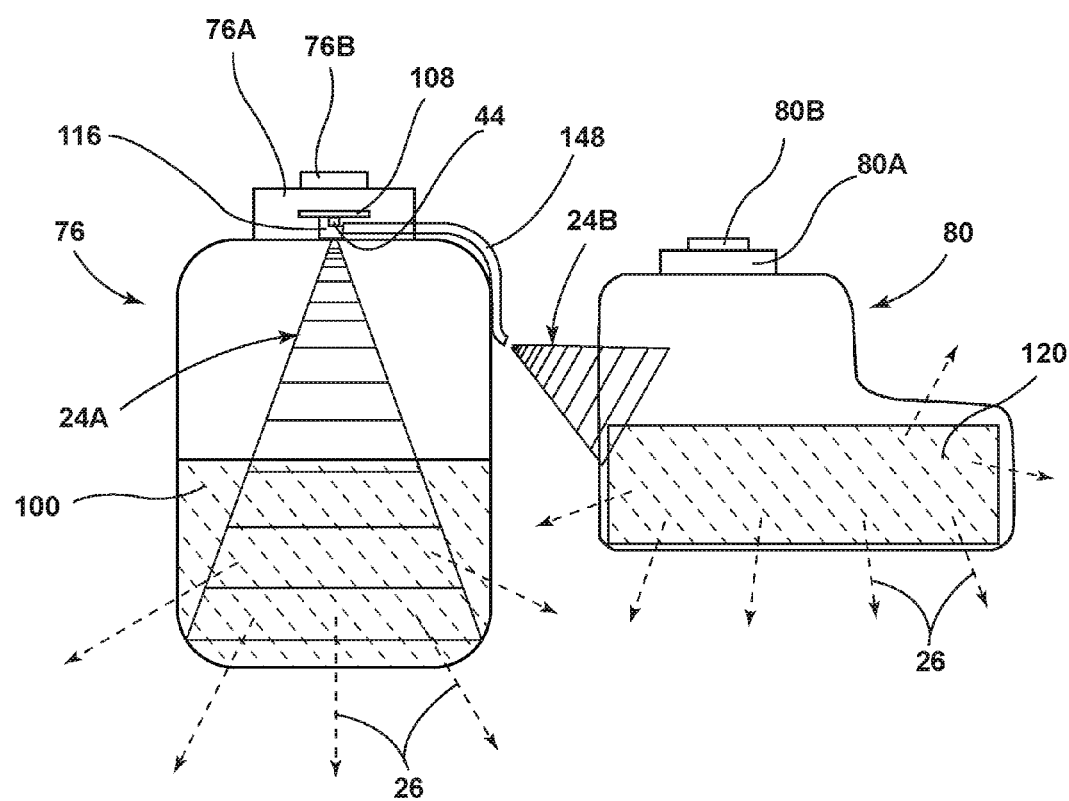
FIG. 5 is a side view of the engine coolant bottle and a washer fluid bottle and illumination system, according to another embodiment.

Referring now to FIG. 5, a light pipe 148 may be positioned on the engine coolant bottle 76 and optically coupled with the light source 44 through the optic system 116. The light pipe 148 may be positioned proximate the window 132 such that the second portion 24B of the excitation emission 24 is transmitted into the light pipe 148. In other embodiments, the light pipe 148 may be directly optically coupled with the light source 44 (e.g., through an optically coupling adhesive). The light pipe 148 may carry the second portion 24B through the light pipe 148 and emit the second portion 24B proximate the washer fluid bottle 80 such that the washer fluid 120 and/or the second indicium 80B are excited.

Use of the illumination system 72 of the present disclosure may offer a number of advantages. First, use of the illumination system 72 may allow for the determination of the fluid level of the coolant fluid 100 and/or the washer fluid 120 in low light circumstances. Additionally, illumination of the coolant fluid 100 and/or washer fluid 120 may provide an aesthetically pleasing illumination to the engine compartment 64. Second, use of the illumination system 72 may allow for the illumination of multiple fixtures within the engine compartment 64 using a single light source 44. Third, use of long-persistent phosphor embodiments of the photoluminescent structure 10 as the indicator 104, first indicium 76B and/or the second indicia 80B may allow for the sustained illumination of the indicator 104, first indicium 76B and/or the second indicia 80B thereby removing the need for consistent illumination (i.e., resulting in a power savings for the vehicle 60) and providing aesthetically pleasing illumination in low ambient light settings. Further, the converted light 26 emitted from the indicator 104, first indicium 76B and/or the second indicium 80B may be of a different color or wavelength such that the indicator 104, first indicium 76B and/or the second indicium 80B may be easily differentiated from the illumination from the coolant fluid 100 or washer fluid 120. Fourth, the electrical energy provided to the light source 44 may be such that a maximum charge of the photoluminescent structure 10 embodied as the first and second indicium 76B, 80B may be imparted prior to the vehicle 60 shutting off accessory power (e.g., about 10 minutes).

It will be understood that the illumination system 72 and the light source 44 may be used in any fixture within the engine compartment 64.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. An engine compartment illumination system, comprising:
    a first container within the engine compartment comprising a first cap, comprising:
        a light source operable to emit an excitation emission;
        a window; and
        an optics system configured to direct a portion of the excitation emission through the window; and
    a second container positioned proximate the first container comprising a second cap;
    an indicia positioned proximate the second cap,
    wherein the excitation emission is configured to excite the indicia.

2. The illumination system of claim 1, wherein the optics system comprises a prism for directing a first portion of the excitation emission into the first container and a second portion through the window.

3. The illumination system of claim 1, wherein the optics system comprises a mirror for directing a first portion of the excitation emission into the first container and a second portion through the window.

4. The illumination system of claim 1, further comprising:
    a light pipe proximate the first cap, wherein the light pipe is optically coupled to the light source and is configured to emit the portion of the excitation emission towards the indicia.

5. The illumination system of claim 1, wherein the first cap includes an indicia, the indicia of the first cap configured to be excited by the excitation emission.

6. The illumination system of claim 1, further comprising:
    an indicator positioned on the first container configured to be excited by the excitation emission.

7. The illumination system of claim 1, further comprising:
    a fluid positioned within the first container, the fluid configured to be excited by the excitation emission.

8. The illumination system of claim 7, wherein a fluid level of the fluid is determined based on a degree of illumination of the container when the fluid is exposed to the excitation emission.

9. An illumination system for a vehicle container configured to contain a fluid, the container comprising:
    a cap positioned on the container of an engine compartment and comprising:
        a light source operable to emit an excitation emission;
        a window; and
        an optics system configured to direct a portion of the excitation emission through the window; and
    an indicator positioned on the container,
    wherein the excitation emission is configured to excite the fluid and the indicator.

10. The illumination system of claim 9, wherein a fluid level of the fluid is determined based on a degree of illumination of the container when the fluid is exposed to the excitation emission.

11. The illumination system of claim 10, wherein the container is an engine coolant container.

12. The illumination system of claim 9, wherein the optics system comprises a prism for directing a first portion of the excitation emission into the container and a second portion through the window.

13. The illumination system of claim 9, wherein the optics comprises a mirror for directing a first portion of the excitation emission into the first container and a second portion through the window.

14. The illumination system of claim 9, further comprising:
    a light pipe positioned on the container.

15. The illumination system of claim 14, wherein the light pipe is optically coupled to the light source through the optics system.

16. An illumination system, comprising:
    a first and a second engine compartment container, the second container containing a fluid;
    a light source positioned on the first container and operable to emit an excitation emission configured to excite the fluid; and
    a light guide optically coupled with the light source and configured to direct the excitation emission toward the fluid such that a fluid level is determined based on a degree of illumination of the second container.

17. The illumination system of claim 16, further comprising:
    an indicium positioned on the second container configured to be excited by the excitation emission.

18. The illumination system of claim 17, further comprising:
    an optics system optically coupled with the light source and configured to direct a portion of the excitation emission into the light guide.

* * * * *